United States Patent [19]

Reimschuessel et al.

[11] Patent Number: 4,888,396
[45] Date of Patent: Dec. 19, 1989

[54] NOVEL CATIONIC ACRYLAMIDE POLYMERS AND PROCESSES FOR THEIR PREPARATION

[75] Inventors: Herbert K. Reimschuessel, Morristown, N.J.; William G. Chiang; George J. W. Tichenor, both of Fayetteville, N.Y.

[73] Assignee: Polypure, Inc., Solvay, N.Y.

[21] Appl. No.: 203,835

[22] Filed: Jun. 8, 1988

Related U.S. Application Data

[60] Division of Ser. No. 13,517, Feb. 11, 1987, Pat. No. 4,777,218, which is a continuation-in-part of Ser. No. 8,132, Jan. 22, 1987, abandoned, which is a continuation of Ser. No. 684,756, Dec. 21, 1984, abandoned, and Ser. No. 785,949, Oct. 10, 1985, abandoned, which is a continuation-in-part of Ser. No. 753,557, Jul. 12, 1985, abandoned, which is a continuation-in-part of Ser. No. 640,262, Aug. 13, 1984, abandoned.

[51] Int. Cl.$^4$ ................................................. C08F 8/30
[52] U.S. Cl. ...................................... 525/379; 210/701
[58] Field of Search ............. 525/379, 380, 374, 329.4

[56] References Cited

U.S. PATENT DOCUMENTS 3,428,617  2/1969  Sobolev .
3,707,465  12/1972  Reinwald ............................. 525/379
4,777,218  10/1988  Reimschuessel ................. 525/329.4

OTHER PUBLICATIONS

EP 187281, Jul. 1986.

*Primary Examiner*—Christopher Henderson
*Attorney, Agent, or Firm*—Robert M. Phipps

[57] ABSTRACT

Novel cationic polymers are provided by reaction of high molecular weight polymers and copolymers of acrylamide with an alkyl epoxide compound such as glycidyldialkylamine or glycidyltrialkylammonium salt to form polymer chain units containing e.g. pendant (N-2-hydroxypropyl) dialkylamine groups of their trialkylammonium salts. Processes for making the graft copolymers are provided in which the reaction is carried out while maintaining the reaction mixture in gel form by swelling the starting solid polymer with a solvent mixture.

The reaction may be carried out in a homogeneous reaction environment or in a heterogeneous reaction environment by dispersing the starting solid polymer in an inert liquid that is a non-solvent for both the polymer and the salt. The polymeric products of the reaction may be hardened with a suitable liquid, such as isopropanol, to a solid particulate material.

28 Claims, No Drawings

NOVEL CATIONIC ACRYLAMIDE POLYMERS AND PROCESSES FOR THEIR PREPARATION

REFERENCE TO RELATED APPLICATIONS

This application is a division of application U.S. Ser. No. 013,517, filed Feb. 11, 1987, now U.S. Pat. No. 4,777,218 granted Oct. 11, 1988, which in turn is a continuation-in-part application of U.S. Ser. No. 008,132 filed Jan. 22, 1987, now abandoned, which is a continuation of Ser. No. 684,756 filed Dec. 12, 1984 now abandoned and U.S. Ser. No. 785,949 filed Oct. 10, 1985 now abandoned which Ser. No. 785,949 is, in turn, a continuation-in-part application of U.S. Ser. No.753,557, filed July 12, 1985, now abandoned which is, in turn, a continuation-in-part application of U.S. Ser. No. 640,262, filed Aug. 13, 1984, now abandoned.

BACKGROUND OF THE INVENTION

This invention relates to cationic, water soluble, high molecular weight acrylamide derived polymers and processes for making them. The polymers are useful for treatment of waste water to separate efficiently the waste from the water.

There is a high and increasing demand for high molecular weight, cationic polyelectrolytes for water treatment, especially for treatment of waste water. There are available certain such high molecular weight polyelectrolytes. For example, high molecular weight polyacrylamide has been modified by grating processes to provide cationic polyelectrolyte polymers which are said to be useful for water treatment. For example, in U.S. Pat. No. 3,707,465, there is disclosed grafted polyacrylamide polymers in which high molecular weight polyacrylamide is said to be grafted by oxamination using base catalysis. Relatively low level of grating was obtained according to the patent (not more than 20 percent grafting). It is indicated in the prior art that the effectiveness of the oxyaminated polyacrylamides in the flocculation water purification process is dependent upon the pH of the waste water (preferably a pH between 6 and 4.3) and the presence of a water soluble inorganic coagulant such as alum. It has been noted that the structure of the oxyaminated polyacrylamide polymers of that prior art was not disclosed.

Prior art related to the formation of cationic polymers suggest either treatment of aqueous polymer solutions with glycidyltrimethylammonium chloride (Reinwald, U.S. Pat. 3,707,465) or copolymerization using comonomers such as 2-hydroxy-3-acryloyloxypropyltrimethylammonium chloride (Sobolev, U.S. Pat. No. 3,329,706). In order to have good flocculating properties, polymers must have high molecular weights and high concentrations of cationic groups. Aqueous solutions of high molecular weight polymes, however, have extremely high viscosities and are difficult to handle; they may have, therefore, generally polymer concentrations of less than 2%. Treatment of such diluted solutions with glycidyltrialkylammonium chloride results primarily in hydrolysis of the glycidyl moiety; any reaction (or grafting) with the polymer, if it occurs at all, results only in insignificant incorporation of cationic groups. These reaction products, therefore, do not exhibit adequate flocculant characteristics. Copolymerization of monomers such as acrylamide with monomers such as 2-hydroxy-3-acryloyloxypropyltrimethylammonium chloride on the other hand, results in products that may have higher concentrations of cationic ggroups but have very low molecular weights. Thus, it is quite apparent that conventional practices can hardly be expected to yield efficient flocculants containing cationic groups derived from glycidyltrialkylammonium salts.

It is therefore an object of this invention to provide a novel class of cationic, water-soluble, high molecular weight polymers which are efficient flocculants.

It is a further object to provide polyelectrolyte polymers which are effective over a broad range of pH in the water to be treated and are substantially free of unwanted units.

It is another object of this invention to provide processes which enable a high degree of grafting to produce good yields of the desired cationic, high molecular weight polymers of the invention.

SUMMARY OF THE INVENTION

The product embodiment of this invention relates to cationic, water soluble, high molecular weight polymers comprising the following polymeric units randomly distributed in the polymer chain:

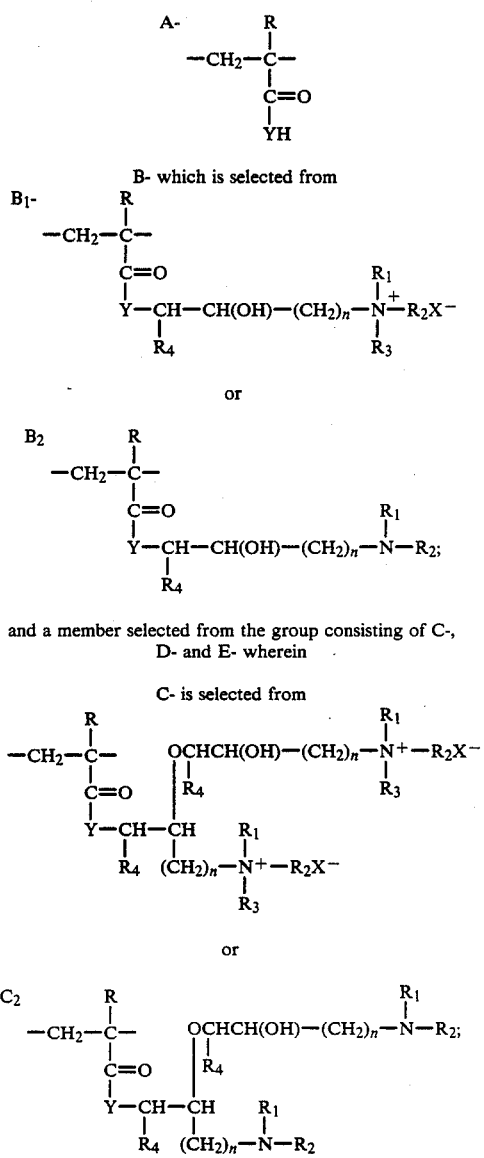

D- is 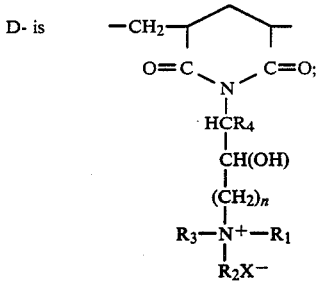

and

E- is 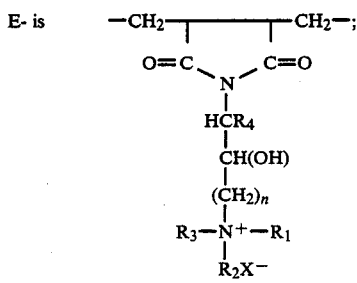

wherein R is hydrogen or methyl; Y is NH or O; $R_1$, $R_2$, and $R_3$ are alkyl groups having 1 to 8 carbon atoms; $R_4$ is selected from the group consisting of hydrogen and alkyl groups having 1 to 3 carbon atoms; "n" is an integer of 1 to 4; the total of "n" and the number of carbon atoms in $R_4$ not to exceed four; X is an anion of a strong acid or hydroxyl; the percentage of "A" units being up to 99 mol percent and the percentage of "B" units being at least 1 mol percent.

The process embodiment of this invention relates to the process of preparing cationic, water-soluble, high molecular weight polymers comprising reacting a preformed solid polymer containing pendant amide groups or both pendant amide and carboxyl grooups with an alkyl epoxide compound in the presence of a solvent for the alkyl epoxide and which swells said polymer and heating the resulting reaction mixture containing said swollen polymer at a sufficient temperature and period of time to complete the reaction.

DETAILED DESCRIPTION OF THE INVENTION AND OF THE PREFERRED EMBODIMENTS

The Product Embodiment of the Invention

Referring to the above formulae for the polymeric units in the polymer chain, preferably $R_4$ is hydrogen. Also, it is preferred that "n" is one. It is further preferred that R is hydrogen. Y may be NH or O.

$B_1$ is the preferred B polymer unit. The presently most preferred $B_1$ polymer unit contains the (N-2-hydroxypropyltrimethyl) ammonium salt substituent.

It is desired that the mol percent of B polymer units be at least about 10 mol percent. It is preferred for some uses that the mol percentage of B polymer units be greater than about 20 mol percent and more preferred in the range of at least about 25 to about 50 mol percent. For other uses, it is preferred that the mol percentage be in the range of about 1.5 to about 20, or about 5 to about 20 or about 1 to about 10 to about 1.5 to about 5. Polymers for some other uses will have other preferred ranges.

The C polymer units are formed by reaction of the B polymer units with additional alkyl epoxide, the reaction taking place at the hydroxyl site. The mol percentages of the C-polymer units will vary with the process conditions, particularly the concentration of the alkyl epoxide, but will generally vary between about 1 to about 5. In order to promote higher concentrations of the highly charged oligomeric side chain recurring unit C, a large excess of alkyl epoxide to polymer and a high reaction temperature (above about 70° C.) are needed. When the molar ratio of alkyl epoxide to polymer is greater than about 2.5, the pH of the reaction mass will be greater than about 11. Under these conditions, the hydroxy group will readily react with the alkyl epoxide to form C-oligomeric side chains.

The D and E polymer units are succinimide and glutarimide structures which are formed by reaction between neighboring chain units. The mol percentage of the D polymer units will vary with the process conditions, but will generally vary between about 0.1 to about 10, preferably about 0.5 to about 5. The mol percentage of the E polymer units will generally vary between about 0.01 to about 3, preferably about 0.1 to about 1. In order to promote higher concentrations of recurring units D and E, high temperatures (above about 70° C.), high pH (above about 7) and an excess of alkyl peptide are needed. At reaction temperature above 70° C., the rate of reaction between two adjacent amide groups to form a cyclic imide will increase. The imidyl anion is formed at high pH which then reacts with the alkyl epoxide to form recurring unit D (six member ring N-substituted cyclic imide). The reaction is maximized by increasing the temperature to about 100° C. or above and maintaining the pH at about 10 or above. The reactions resulting in recurring unit E are the same as those mentioned for D above, except that the imide is formed from two amides spaced one carbon closer together.

X is an anion of a strong acid and is suitably halide (preferably chloride), nitrate, sulfate, bisulfate or perchlorate.

The final polymeric reaction product may contain, depending upon the reaction conditions employed, small amounts of other recurring polymeric units as a result of hydrolysis and esterification reactions.

Another presentation of illustrative final polymeric structures according to the invention are those comprising:

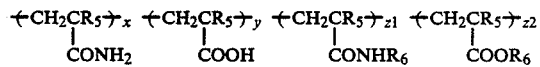

Where $R_5$ may be H or lower alkyl
$R_6$ may be $CH_2CHOHCH_2N(R_7)_3A^-$
$R_7$ is lower alkyl group of 1 to 7 carbon atoms
A is halogen, or $NO_3$, or $SO_4$
x is from 0.1 to 0.95
y is from 0 to 0.40
z1 is from 0.01 to 0.50
z2 is from 0 to 0.60

The acrylamide polymers and copolymers used to make the polymers of this invention have high molecular weights, desirably at least one million, preferably molecular weights of at least two million, still preferably molecular weights in the range of two to ten million or greater and, most preferably, molecular weights of at least about 5 million. The starting polymer is preferably non-ionic and is free or substantially free of units which interfere with the desired properties. In the determination of polymer molecular weights, it has been found reliable to use intrinsic viscosity measurement.

The Process Embodiments of the Invention

There are two major process embodiments of the invention. Both embodiments involve reacting a preformed solid polymer containing pendant amide groups with an alkyl epoxide compound in the presence of a solvent for the alkyl epoxide and which swells the polymer. The swollen polymer is in a gel-like state. Any solvent or solvent mixture can be employed which is a solvent for the alkyl epoxide and which swells the polymer. An illustrative useful single solvent compound is ethylene glycol. An illustrative solvent mixture is a mixture of water and an alkanol.

In one embodiment of the process invention, the reaction is carried out in the presence of the solvent and swelling agent only which creates a homogeneous reaction system.

In another embodiment of the process invention, the reaction is carried out in the additional presence of a non-solvent for both the alkyl epoxide and the polymer which serves to disperse the polymer and create a heterogeneous reaction system.

The process embodiments will now be described separately.

The Homogeneous Process Embodiment

The homogeneous process embodiment of the invention involves carrying out the grafting reaction in the gel state by swelling a mixture of a polymer having pendant amide groups such as solid polyacrylamide and a suitable alkyl epoxide compound with an appropriate solvent as described above.

Preferably, the epoxide compound is a glycidyltrimethylammonium salt, such as halide, nitrate, sulfate, or the like. Other appropriate epoxide compounds can be used instead to provide polymers having grafts of the above described formulas.

Candidate constituents of solvent systems which interact adequately with the homopolymers and copolymers derived from acrylamide are members of the group consisting of alkanols (such as methanol), ethylene glycol, dimethyl sulfoxide, and water. Depending on the polymer composition, these agents may be used either as the sole solvent or as a constituent of a mixture of solvents.

The preferred solvents are ethylene glycol or solvent mixtures comprising water and an organic solvent which is water miscible. Illustrative suitable organic solvent/water solvent mixtures are alcohol/water and dimethyl-sulfoxide (DMSO)/water combinations. In such solvent mixtures, the ratio of organic solvent in water can vary. Generally, 1:1 ratio by volume is suitable. The amount of the solvent used generally is from about 20 to about 50 percent by weight based on the total reaction mixture weight, a preferred amount being about 35 percent.

The polyacrylamide reaction gel is made by swelling polyacrylamide in fine particle form (suitably passing a 60 mesh screen) with the solvent having the desired epoxide compound dissolved therein. The amount of epoxide compound used depends upon the amount of grafting desired. The resulting reaction mixture is placed into a suitable reactor such as a stainless steel bomb and is preferably heated to a temperature and for a period of time sufficient to achieve a high degree of grafting. The reaction temperature is suitably between about 50° C. to about 120° C., preferably between about 80° C. to about 100° C. The reaction time suitably is between about 2 to about 80 hours, depending upon reaction temperature and degree of grafting desired.

At the higher reaction temperatures, especially using the higher concentrations of epoxide compound, some crosslinking can occur resulting in some insoluble polymeric material. This crosslinking can be minimized by increasing the ionic strength of the reaction mixture by the addition of a compatible salt. Suitable salts include organic as well as inorganic salts. Preferred salts include sodium nitrate, sodium chloride, guanidine nitrate, guanidine sulfate, and the like. A suitable amount of salt is one mol of salt per 10 mols of polymer. This can be varied to obtain optimum results in a particular reaction.

Upon completion of the reaction, the grafted polymer reaction product, which remains as a swollen, rubbery mass, is washed thoroughly with a suitable solvent such as methanol to remove unreacted epoxide compound and unwanted by-products. The polymer product can be dissolved and used directly. Alternatively, the polymer products can be further purified by dissolving in water and precipitating from the aqueous solution. The polymer product is dried and pulverized to a suitable size for use.

Based upon $^{13}$C-NMR. $^{15}$N-NMR, FT-IR and UV analyses, the desired polymeric units of acrylamide, acrylamido-2-hydroxypropyltrimethyl ammonium salt, and N-substituted succinimide and glutarimide are obtained when the epoxide compound used is glycidyltrimethylammonium chloride to graft polyacrylamide.

The Heterogeneous Process Embodiment

The heterogeneous process embodiment of this invention involves conducting the reaction in the presence of a non-solvent for both the alkyl epoxide and the polymer to disperse the reaction mixture and create a heterogeneous environment.

Although epoxide salts, such as the glycidyltrialkylammonium salts, are soluble in a wide variety of solvents, it is found that reaction of the dissolved salt with the solid polymer occurred only when the salt solvent system was capable of interaction with the particular polymer. This capability of interaction was found to be a function of the polymer composition and was manifested by the ability of the particular solvent system to swell or dissolve the polymer.

Candidate constituents of solvent systems useful in this embodiment are the same as described for the homogeneous embodiment.

In the presence of an appropriate solvent system the reaction between the epoxide salt and the acrylamide polymers or copolymers resulted in very swollen, often almost gel-like reaction products which could not be readily isolated in a form suitable for further use. It was found, however, that treatment of these reaction products with isopropanol resulted in hard, granular materials which could be easily isolated by filtration, washed with additional isopropanol to extract unreacted epoxide salt and solvent residues, and which after drying could be readily ground to further reduce the particle size. Since treatment of the initial reaction products with excess methanol or ethanol caused extensive swelling resulting in unfiltrable materials, it was quite surprising that isopropanol showed no such interaction with any of the polymeric reaction products obtained according to the present invention.

In practice of the heterogeneous process embodiment of this invention, cationic groups derived from glycidyltrialkylammonium salts, are readiy incorporated at concentrations amounting to 25% to 45% of the final polymer weight of acrylamide derived polymers or copolymers having molecular weights that may exceed the range of weight average molecular weight of $10 \times 10^6$ to $15 \times 10^6$. The heterogeneous process embodiment of this invention can be carried out with high efficiency and simplicity by first dispersing the solid polymer in a mixture consisting of a chosen solvent solution of the glycidyltrialkylammonium salt, for example, and an inert liquid that is substantially or completey a non-solvent for both the polymer and the salt, allowing the polymer to absorb the glycidyltrialkylammonium salt solution by intensively stirring the polymer dispersion and then inducing reaction by heating the mixture. Generally, stirring at room temperature for at least 10 minutes is sufficient but, preferably, stirring should be continued for about 30 to 60 minutes. The reaction is effected by heating to a sufficient temperature for a sufficient period of time as can be readily determined. Generally, however, to complete the reaction, temperatures in the range of 60° C. to 100° C. should be maintained for at least about 1 hour, and preferably from about 3 to 20 hours. The mixture is then cooled to room temperature and an excess of isopropanol (3 to 4 times the volume of the reaction mixture) may be added to harden the polymeric reaction product which has at this stage the consistency of a flexible semi-solid material. As the isopropanol induced hardening proceeds, the reaction product disperses upon intense agitation into small particles. Thereafter, the hardened polymer particles may be collected on a filter, washed with additional isopropanol, and dried. If desired, the polymer particles may subsequently be subjected to fine grinding and packed in bags for shipping. The polymers thus obtained are readily soluble in water, and show excellent efficacies as agents for dewatering sludges and as clarification aids for waste water and sewage.

In accordance with the invention, the solvent used to dissolve the epoxide salt may be any of the various liquids such as methanol, water, methanol-water, methanol-dimethyl sulfoxide, methanol-ethylene glycol, ethylene glycol, and homologs of of ethylene glycol and their mixtures with lower alkanols.

Though water is the most potent member of the group of solvents that are capable of interaction with acrylamide derived polymers, its use may in some instances be disadvantageous since water reacts also quite readily with glycidyltrialkylammonium salts forming the corresponding N-(3-hydroxy-2-hydroxypropyl) trialkylammonium salts. Since the latter do not participate in the reaction with the polymer, their formation constitutes a loss of an expensive reactant and thus an impairment of process economics and efficiency. Unexpectedly, however, it was found that reactions, such as the one entailing polyacrylamide that had required the presence of water to proceed could also be conducted when water in the salt solvent system was replaced by ethylene glycol. Loss of glycidyl groups by side reactions is thus minimized, and using conventional procedures, any excess or unreacted glycidyltrialkylammonium salt can be readily recovered from the combined isopropanol solutions obtained from the work-up operations of the polymeric reaction product.

A salient feature of the process embodiments of this invention are their flexibility with respect to constitutional parameters of the polymers that may be employed and the final reaction product. Procedures of the execution of these embodiments are unaffected by the polymer molecular weight, and may require only minor, if any, adjustments for either or both accommodation of different chemical compositions of the starting polymer and effecting different extents of reaction in the final product. Polymers with moderate to extremely high molecular weights can be used with equal feasibility. The chemical composition of the starting polymer affects the extent of swelling by a given solvent-salt solution and affects thus the propensity for reaction. For instance, a 50% methanol-glycidyltrimethylammonium chloride solution swells a copolymer consisting of 70 mole percent acrylamide and 30 mole percent of acrylic acid adequately to effect reaction at temperatures in the range of 60° C., whereas for an acrylamide homopolymer the presence of water or glycol in the salt solution is required to effect reaction which proceeds in this case at reasonable rates at temperatures in the range of 70° C. to 90° C.

In the heterogeneous process embodiment of the invention, the dissolved glycidyltrialkylammonium salt is reacted with the solid acrylamide derives polymer by first dispersing the solid polymer in a mixture consisting of a solution of the epoxide salt (e.g. glycidyltrialkylammonium salt) in the chosen solvent and in an inert liquid that is substantially or completely a non-solvent for both the polymer and the salt, thereby allowing the polymer to absorb the glycidyltrialkylammonium salt solution. This is effected by maximizing contact, e.g., such as by vigorously stirring the polymer dispersion at room temperature for at least about 10 minutes and preferably for about 30 to 60 minutes, and then inducing reaction by heating the mixture to temperatures in the range of about 60° C. to 100° C. for at least about 1 hour, and preferably from about 3 to about 20 hours. The thus prepared cationic polymer may be used as derived but preferably it is separated. To separate the cationic polymer, the reaction mixture is cooled to room temperature and preferably hardened. An excess of isopropanol, or other suitable hardener, is added to harden the polymeric reaction product, which has at this stage the consistency of a flexible semi-solid material, to facilitate handling. The isopropanol or other hardener is employed in several volumes (e.g. 3–4) of the volume of the reaction mixture. As the isopropanol induced hardening proceeds, the reaction product disperses upon agitation into small particles. Thereafter, the hardened polymer particles may be collected on a filter, washed with additional isopropanol and dried.

Suitable acrylamide polymers and copolymers for use in practice of both the homogeneous and heterogeneous embodiments of the invention are commercially available. Polyacrylamide can be made by generally conventional polymerization procedures such as emulsion polymerization procedures. Suitable catalysts for the emulsion polymerization are azo catalysts such as 2,2'-azobis(2,4-dimethyl valeronitrile), ammonium persulfate, and the like or redox initiator systems such as illustrated in U.S. Pat. No. 3,707,465. Part or all of the acrylamide units can be methyl substituted acrylamide, or methacrylamide, so long as the desired flocculating and other properties are retained.

Such acrylamide derived polymers include copolymers of acrylamide or methacrylamide as well as homopolymers thereof and copolymers of either acrylamide and methacrylamide with a polymerizable $CH_2=C<$-group contaning co-monomer. In copolymers, the acrylamide orr methacrylamide monomer or a mixture thereof is present in amounts of at least 30 percent by weight of the total weight of the acrylamide derived copolymer.

The proportion of units derived from the alkyl epoxide (e.g. glycidyltrialkylammonium salt) present in the polymer and based on the total weight of the final cationic polymer containing the acrylamide or methacrylamide polymer may very from about 10 percent to about 50 percent, preferably from about 25 percent to about 45 percent.

When the acrylamide derived polymer is a copolymer with a $CH=C<$ co-monomer, rather than a homopolymer of acrylamide of methacrylamide, or a copolymer with mixtures of acrylamide and methacrylamide, the $CH_2=C<$ co-monomer may be present in amounts of up to about 70 percent by weight, the balance being the acrylamide co-monomer. Any $CH_2=C<$ co-monomer that is known to be polymerizable with the acrylamide co-monomer may be used in preparing the acrylamide copolymer, e.g. acrylic or methacrylic acid, methyl or ethyl-acrylate or methacrylate, acrylonitrile, styrene, and the like.

The polymers of this invention are highly charged polyelectrolytes useful in solid-liquid separation processes. Polymers of this invention are especially useful in the dewatering of sewage sludge and treatment of other commercial process sludges such as refinery, chemical process, and paper and pulp sludges. They can be used effectively in other flocculation and filtration processes. Also, polymers of this invention are useful for treatment of paper and other fibrous materials.

The following Examples are illustrative of the homogeneous process embodiment of the invention.

EXAMPLE 1

4.0 g. (0.056 mol) of pulverized polyacrylamide (Allied CLARIFLOC N103) and 15.44 g. (0.084 mol) of 83% glycidyltrimethyl ammonium chloride (GTAC) (Fluka Chemical Corporation) are weighted into a 35 ml. screw top glass vial. 4 ml. of methanol are added to the mixture to dissolve the GTAC, then 4 ml. of water are added with stirring to swell the polyacrylamide-GTAC-methanol slurry to form a homogeneous rubber (gel-like) reaction mixture. The vial is sealed and heated in a 70° C. oill bath for 65 hours. The vial is then cooled to room temperature and opened cautiously. The reaction product remains as a swollen, rubbery (gel-like) mass, which is washed and extracted thoroughly with excess methanol to remove untreated GTAC and other unwanted by-products. The desired acrylamide-acrylamido-2-hydroxypropyltrimethylammonium chloride copolymer product is then dissolved directly into water for use as a flocculant or for other uses. Allternatively, the product can be dried under vacuum at room temperature and pulverized for final use. The polymer product has a molecular weight of $5\times10^6$.

$^{13}$C-NMR, $^{15}$N-NMR and FT-IPR analyses indicate the polymer has acrylamie and acrylamido-2-hydroxypropyltrimethylammonium chloride polymeric units. Based on colloid titration, which is based on a measure of the charge of polymer molecules, 26 mol percent of quaternary amine is formed in the product. The polymer has recurring polymeric units which include the following:

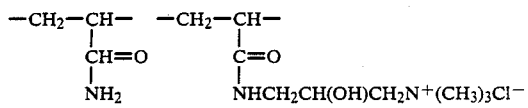

and

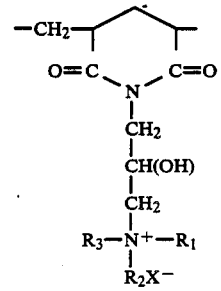

It is believed that the polymer also has the following recurring polymeric units.

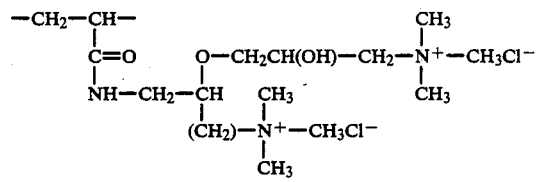

and

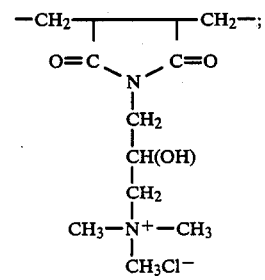

The infrared spectra of the polymer products shows peaks at 1553 cm$^{-1}$ (—C-NHR) and 1612 cm$^{-1}$ (—C-NH$_2$). No peak at 1553 cm$^{-1}$ is found in the polyacrylamide spectra, indicating secondary amide was formed during the reaction.

$^{13}$C-NMR spectra of modified polyacrylamide has two C=O signals in the carbonyl region with chemical shifts (ppm) 180.07 (s), 178.3 (s), with additional resonances at 69.13 (s), 65.46 (2), 55 (s), 44.21 (s), 43-42 (m), and 36-34 (m).

$^{15}$N-NMR spectra of modified polyacrylamide indicates three different types of nitrogen with chemical shifts (ppm) at 114.66 (secondary amide nitrogen), 111.27 (primary amide nitrogen), and 44.70 (quaternary amine nitrogen).

The UV spectra of the modified polyacrylamide has an absorption band with a peak at 252 nm, while glutarimide (6 member ring cycloimide) also has a peak at 252 nm. This implies that the six-membered ring imide was formed in GTAC modified polyacrylamide polymer, as the other moieties do not absorb in the UV.

Colloid tritration, FT-IR, $^{13}$C-NMR, $^{15}$N-NMR spectra and UV spectra are consistent with the proposed structure.

EXAMPLE 2

Pulverized polyacrylamide in the amount of 3 g. (0.042 mol), (Allied CLARIFLOX NX-120) and 11.58 g. (0.063 mol) of 83% glycidyltrimethylammonium chloride (GTAC) (Fluka Chemical Corporation) are weighed into a 35 ml. screw top glass vial. 4 Ml. of methanol are added to the mixture to dissolve GTAC. To this polyacrylamide-GTAC-methanol mixture is added a solution of 0.36 g. sodium nitrate in 4 ml. water and a homogenous rubber (gel-like) mass is formed. The vial is sealed and heated in a 80° C. oil bath for 16 hours. The desired reaction product acrylamido-2-hydroxypropyltrimethylammonium chloride polymer is purified by the same procedure used in Example 1. The polymer product has 38 mol percent quaternary amine as determined by colloid titration and a molecular weight of approximately $7 \times 10^6$.

EXAMPLE 3

The procedure of Example 2 is followed. The homogeneous rubbery (gel-like) reaction mixture is sealed in a screw top glass vial and heated in a 90° C. oil bath for seven hours. The product obtained has 32 mol percent quaternary amine by colloid titration, and molecular weight of approximately $7 \times 10^6$.

EXAMPLE 4

The procedure described under "EXAMPLES" in col. 3, lines 50-63 of U.S. Pat. No. 3,707,465 is generally followed using trimethylammonium-2-3-epoxypropane chloride (glycidyltrimethylammonium chloride), which procedure is incorporated hereby by reference. Analysis ($^{13}$C-NMR) shows that a graft terpolymer is obtained having acrylamide units (chemical shift ppm, 180), acrylic acid salt units (chemical shift ppm, 183), and ester units (chemical shift ppm, 177) of the following structure:

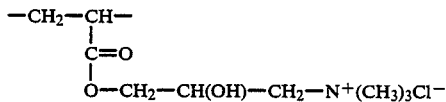

The following Examples are illustrative of the heterogeneous process embodiment of the invention.

EXAMPLE 5

Use of a methanol-DMSO mixture as a solvent for GTAC in the reaction with an acrylamide (AM)-acrylic acid (AA) copolymer.

A solution of 300 g of glycidyltrimethylammonium chloride in a mixture of 170 g DMSO, 850 g methanol, and 500 g kerosene was placed into a reactor equipped with a stirrer, gas inlet tube and a condenser. To this mixture was added 100 g of an acrylamide-acrylic acid copolymer containing 67.11 mole percent acrylamide units. The mixture was agitated, heated to a temperature in the range of 65° C. to 70° C. and a stream of nitrogen was passed oveer the reaction mass. After 20 hours, about 720 g of methanol had distilled from the reaction mixture and collected in a receiver. The reaction mixture had turned into a semi-solid (gel-like) mass. It was cooled to a temperature in the range of 25° C. to 30° C., and about 1000 ml isopropanol were added. After about 2 hours, the flexible, semi-solid (gel-like) reaction product had transformed into a dispersion of hard polymer particles. After another hour of agitation, the polymer particles were collected on a filter, washed with isopropanol and redispersed in 500 ml isopropanol, agitated for an additional hour, and finely collected by filtration and dried in vacuum at about 40° C. 170 g of dry reaction product was obtained. It contained 47.99% carbon, 10.39% nitrogen, 9.84% chlorine, 8.0% hydrogen, and 22.0% oxygen.

The actual quantity of glycidyltrimethylammonium chloride (GTAC) incorporated can be calculated from this elemental composition, using the following stoichiometrical equation:

Weight % of GTAC—$(15164/(R-2))/(72.06-0.98x_o+151.64/(R-2))$ where $R=(\%C/\%Cl)/1.01616$ and $x_o$ is the mole fraction of acrylamide derived units in the starting polymer. Accordingly, the modified polymer contained 43.14 wt. % GTAC derived units.

EXAMPLE 6

To show the effect of the methanol concentration on the extent of GTAC incorporated into an AM/AA copolymer.

The same procedure and quantities were applied as in Example 5, except that only about 250 g of methanol were removed from the reaction mixture during the reaction. Yield of dry polymer was 136 g. The polymer had the following elemental composition: 48.43% carbon, 10.70% nitrogen, 6.92% chlorine, and 7.28% hydrogen. Based upon this composition, the modified polymer contained 30.27 wt. % GTAC derived units.

EXAMPLE 7

To demonstate both the use of a 50% Methanol-GTAC solution for the reaction with AM/AA copolymer, and the extent to which excess GTAC can be recovered.

100 g of an acrylamide-acrylic acid copolymer containing 67.14 mole percent acrylamide units were added to a stirred solution of 300 g of glycidyltrimethylammonium chloride in 300 g of methanol. The mixture was agitated for 1 hour, then 320 g of kerosene were added, and the resulting mixture was heated to 60° C. for 20 hours. At this time, the gel-like semi-solid reaction mass was cooled to ambient temperature and 1 liter isopropanol was added. Upon continued agitation, the reaction mass dispersed into small, rigid particles, which were collected on a filter, subjected to two additional extractions each with 500 ml of isopropanol and finally dried in a vacuum oven at 40° C. Yield was 179.3 g dry polymer.

Elemental analysis: 46.61% carbon, 10.00% nitrogen, 10.06% chlorine, 8.19% hydrogen.

Based upon the elemental analysis the modified polymer contained 45.33 wt. percent of GTAC derived units.

Both the filtrate from the reaction mixture and that from the isopropanol extractions were combined. Isopropanol and methanol were removed by vacuum distillation. A residue consisting of two layers resulted. The upper layer was pure kerosene, the lower solidified upon standing at ambient temperature, its weight was 216 g. NMR analysis of this material indicated the presence of GTAC, the diol N-(3-hydroxy-2-hydroxypyl) trimethylammonium chloride (HOCH$_2$CH(OH)CH$_3$+N(CH$_3$)$_3$Cl$^-$), and the chlorohydrin (ClCH$_2$CH(OH)CH$_2$+N(CH$_3$)$_3$Cl$^-$) at a molar ratio of 0.911 to 0.078 to 0.011. There were only traces of some unidentified impurities indicated in the NMR spectrum. According to the NMR analysis, therefore, the solid residue consisted of 194.5 g of GTAC, 18.6 g of the diol, and 2.9 grams of the chlorohydrin. Thus, the GTAC utilization, which is the sum of the GTAC reacted and the GTAC recovered divided by the initial amount of GTAC, was about 92%.

GTAC-Utilization=$(169.3 \times 0.4533 + 194.5)/300 = 0.92$.

The GTAC recovery yield, which is the amount of GTAC recovered divided by the difference of the initial amount of GTAC and the GTAC reacted with polymer, was about 89%.

GTAC-Recovery Yield=$194.5/(300 - 179.3 \times 0.4533) = 0.89$.

EXAMPLES 8(A) and 8(B)

These examples describe attempts to effect reaction of polyacrylamide using 50% methanol-GTAC solutions at 60° C. and 90° C.; these examples show that no reaction occurs.

(A) 100 g polyacrylamide containing 94.7 mole percent of acrylamide units were treated with 600 g of a methanol solution containing 300 g of glycidyltrimethylammonium chloride in a kerosene dispersion as described in Example 3. There was not observed any apparent change in the physical shape of the polymer granules during the 20 hour treatment at 60° C. There was also no weight increase of the polymer after isolation, extraction with isopropanol, and drying at 40° C. in vacuum. The elemental analysis gave 50.52% carbon, 18.60% nitrogen, 7.00% hydrogen, and no chlorine.

(B) A repeat of the same experiment, except that the reaction mixture was heated to 90° C. for 6 hours in a closed vessel, yielded about 100 g of dry reaction product containing 50.40% carbon, 18.35% nitrogen, 7.05% hydrogen, and 0.54% chlorine. Based upon this elemental composition, the reaction product contains only about 2.3 weight percent of GTAC derived units.

These examples demonstrate that methanol alone does not function as an effective solvent on polyacrylamide homopolymer; whereas, methanol alone does function as an effective solvent on polyacrylamide copolymer as described in Examples 6 and 7.

EXAMPLE 9

This example shoes that water effects reaction between GTAC and polyacrylamide; it also demonstrates that most of the excess GTAC is converted to the diol by reaction with the water.

100 g polyacrylamide containing 94.7 mole percent of acrylamide units were treated in kerosene dispersion with a solution containing 300 g glycidyltrimethylammonium chloride, 150 g methanol and 150 g water for 6 hours at 90° C. After this time the swollen, rubbery (gel-like) reaction mixture was cooled to ambient temperature and treated with isopropanol as described in Example 7. 145 g of dry polymer were obtained. The elemental analysis gave 49.44% carbon, 12.62% nitrogen, 8.36% chlorine, and 7.63% hydrogen. Based upon this analysis about 35.8 wt. percent GTAC had been incorporated into the polymer.

The filtrate of the reaction mixture and the solutions from the isopropanol extractions were worked-up as described in Example 7 and yielded 266 g residue consisting (according to NMR analysis) of three major compounds: GTAC, the diol (HOCH$_2$CH(OH)CH$_3$+N(CH$_3$)$_3$Cl$^-$), and the chlorohydrin (ClCH$_2$CH(OH)CH$_2$+N(CH$_3$)$_3$Cl$^-$). In addition to some unidentified trace impurities, the three main compounds were present at a molar ratio of 0.084 to 0.90 to 0.016. Thus, the residue consisted of 20.12 g of GTAC, 241.04 g of the diol, and 4.84 g of the chlorohydrin.

In this case the GTAC-Utilization was only 24% ($(145 \times 0.358 + 20.12)/300 = 0.24$) whereas the GTAC Recovery Yield ($20.12/(300 - 145 \times 0.358) = 0.081$) was only 8.11%.

Although water serves as a solvent/swelling agent for the reaction of GTAC with polyacrylamide, the presence of water causes extensive hydrolysis of the GTAC to the diol.

EXAMPLE 10

Demonstrates that reaction between GTAC and AM/AA copolymer proceeds in the presence of ethylene glycol.

100 g of an acrylamide-acrylic acid copolymer containing 68.2 mole percent of acrylamide units were added to a stirred soluton of 300 g of glycidyltrimethylammonium chloride in 300 g ethylene glycol and 900 g methanol. The mixture was stirred for 2 hours. Then 300 ml of kerosene were added and about 800 g of methanol were removed by distillation at a reduced pressure of about 8 mm Hg. After applying normal pressure with nitrogen, the reaction mixture was heated to 60° C. for 6 hours, then cooled to 25° C. and worked-up with isopropanol as in Example 5, yielding 147 g of dry product. The elemental composition was: 45.09% carbon, 10.63% nitrogen, 7.61% chlorine, and 7.50% hydrogen. Based upon this analysis, the polymer contained 35.69 wt. percent of GTAC derived units.

EXAMPLE 11

Shows that GTAC reacts with polyacrylamide in a water free system when ethylene glycol is used as the GTAC solvent; the example also shows that excess GTAC can be recovered in high yields from the ethylene glycol system.

100 g of polyacrylamide containing 94.7 mole percent of acrylamide units were added to a solution of 430 g glycidyltrimethylammonium chloride in 430 g ethylene glycol and agitated for 1 hour at 24° C. Then 500 ml kerosene were added and the temperature increased to 90° C. After 4 hours the temperature was decreased to 24° C. and the flexible semi-solid (gel-like) reaction product treated with isopropanol. 137 g of dry polymer were obtained. The elemental composition was: 42.93% carbon, 13.04% nitrogen, 5.67% chlorine, and 7.14% hydrogen. Based upon this analysis, the polymer contained 28.11 wt. percent of GTAC derived units.

The filtrates of the reaction mixture and the isopropanol extractions were combined and worked-up as described in Example 7.

Removal of the isopropanol and kerosene yielded in this case 812 g of a light yellow liquid. Its composition was determined by NMR analysis and comprised GTAC, the ether (HO(CH$_2$)$_2$OCH$_2$CH(OH)CH$_2$+(CH$_3$)$_3$Cl$^-$), and the ethylene glycol, as well as traces of the diol and chlorohydrin, at a molar ratio of 0.233 to 0.052 to 0.714 to 0.001. According to these molar ratios, the liquid consisted of 315 g GTAC, 100 g of the glycol ether, 395 g of ethylene glycol and less than 2 g of the diol and the hydrochlorin which in all possibility were present in the original GTAC.

GTAC-Utilization was 82.2%, according to (315+137×0.281)/430=0.822, and GTAC-Recovery was 80.5% according to the 315/(430−137×0.281)=0.809.

Comparing the result of this example with the result of Example 8 shows clearly the considerable improvement in utilization (82.2% vs. 24%) and recovery (81% vs. 8.1%) of the glycidyl compound realized by use of ethylene glycol instead of water in reaction of glycidyltrimethylammonium chloride with polyacrylamide.

The following examples show the effective use of the products of the invention as water treating agents.

EXAMPLE 12

Show the Effectiveness as Flocculants.

The modified polymers obtained according to the present invention were subjected to a filtration test which is performed as described in Degremont, Water Treatment Handbook, 5th Edition 1979 p. 859. This test yields as a function of the amount of polymer flocculant applied (dose in ppm) values for the specific resistance to filtration (SFR) which is expressed in $sec^2$/gram units. The polymers obtained in Examples 5 through 11 were tested on digested municipal sludges. For this type of sludge, and any value of SFR smaller than $500 \times 10^3$ characterized flocculant treated sludge compositions that are suitable for efficient dewatering operations. Up to this level, the effectiveness of a particular flocculant is primarily reflected in the polymer amount (Dose) required. The curve representing the SFR-Dose relation is characterized by a specific combination of these two quantities at which the SFR is at a minimum. Listed in Table 1 are minimum SFR values and the corresponding dose levels for polymers of this invention (Examples 5 through 11), of polymers with the unmodified backbone structure (AM, AM/AA-70/30), and of a highly effective commercial flocculant of a different cationic structure.

TABLE 1

| Polymer | FILTRATION TEST RESULTS | |
|---|---|---|
| | $10^3$ SFR ($Sec^2$/gram) | Dose (ppm) |
| Ex. 5 | 21.0 | 240 |
| Ex. 6 | 24.0 | 217 |
| Ex. 7 | 11.0 | 217 |
| Ex. 8A | >10,000.0 | 240 |
| Ex. 8B | >3,000.0 | 240 |
| Ex. 9 | 70.0 | 165 |
| Ex. 10 | 107.0 | 207 |
| Ex. 11 | 72.0 | 138 |
| AM* | >10,000 0 | 240 |
| AM/AA (70/30)* | >10,000.0 | 240 |
| Commercial Floc. | 63.0 | 206 |

*AM in polyacrylamide AM/AA (70/30) is copolymer with 70 mol percent acrylamide and 30 mol percent acrylic acid.

EXAMPLE 13

Evaluation as Sewage Sludge Flocculating Agents.

The GTAC-modified polyacrylamide products are evaluated as conditioning aids for a sewage sludge. There are many ways to measure the effectiveness of polymers in coagulation and flocculation. The parameter which is used to evaluate and compare the copolymers of this invention is Specific Filtration Resistance (SFR). In general, the lower the SFR value, the better the floc development and filtration, and the more effective the polymer.

Using anaerobically digested sludge from the Syracuse Metro Waste Treatment Plant as substrate, a number of samples are evaluated by SFR testing. The SFR testing procedures involve treatment of a 400 ml. sample of sludge having approximately 2–5 percent solids. The appropriate polymer dosage (10–200 parts by weight per million parts of sludge) is added to the sludge sample and mixed by transferring polymer-sludge mixture from one cup to another sixteen times. The conditioned sludge is poured into a Buchner funnel fitted with a trigger cloth filter. The filtrate volume is noted at various time intervals. Normally, six polymer doses are examined for each polymer. The filtration rate (ml./min.) increased with increasing polymer dosage up to an optimum. After reaching the minimum SFR, the filtration rate decreased with increasing polymer dosage. SFR ($sec^2$/g.) is then plotted versus polymer concentration (ppm); the closer the minimum of the curve is to the origin, the better is the polymer performance.

The following table summarizes the results comparing acrylamide-acrylamido-2-hydroxypropyltriammonium chloride polymers of this invention with commercial Percol 757 (Allied Colloid, Inc.). The polymer dose (ppm) necessary to achieve an SFR of 1.0E6 is given.

TABLE 2

| Polymer Used | | Invention | |
|---|---|---|---|
| (mol. wt.) | (mol percent graft units) | Polymers Dose (ppm) | Percol 757* Dose (ppm) |
| $7.7 \times 10^6$ | 28 | 150 | 160 |
| $7.4 \times 10^6$ | 26 | 135 | 145 |
| $7.4 \times 10^6$ | 30 | 130 | 140 |
| $7.4 \times 10^6$ | 32 | 160 | 180 |

*Percol 757 is a commercial flocculating polymer sold by Allied Colloids. Inc. It is a copolymer of acrylamide units and acryloxyetyltrimethylammonium chloride units. It has a molecular weight of approximately $7 \times 10^6$.

The data show that the polymers of the invention as listed in Table 2 take less dosage than the copolymer product Percol 757 for the flocculation.

While particular embodiments of the invention have been described, it will be understood, of course, that the invention is not limited thereto since various modifications may be made. It is, therefore, contemplated to cover by the appended claims any such modifications as fall within the spirit and scope of the invention.

We claim:

1. A process of preparing caationic, water-soluble, high molecular weight polymers comprising reacting a preformed solid polymer containing pendant amide groups with an alkyl epoxide compound in the presence of a solvent for the alkyl epoxide and which swells said polymer and heating the resulting reaction mixture containing said swollen polymer at a sufficient temperature and period of time to complete the reaction.

2. A process as defined in claim 1 wherein said solvent is a combination of water and a water miscible organic solvent.

3. A process as defined in claim 2 wherein said water miscible organic solvent is selected from an alcohol and dimethylsulfoxide.

4. A process as defined in claim 2 wherein said water miscible organic solvent is an alcohol.

5. A process as defined in claim 2 wherein said polymer is a high molecular weight polyacrylamide.

6. A process as defined in claim 2 wherein said polymer is a high molecular weight acrylamide-acrylic acid copolymer.

7. A process as defined in claim 5 wherein said polyacrylamide has a molecular weight of at least five million.

8. A process as defined in claim 6 wherein said copolymer has a molecular weight of at least 5 million.

9. A process as defined in claim 2 wherein said alkyl epoxide is a tertiary amine.

10. A process as defined in claim 2 wherein said alkyl epoxide is a glycidyltrialkyl ammonium salt.

11. A process as defined in claim 10 wherein said alkyl epoxide is a glycidyltrimethyl ammonium salt.

12. A process as defined in claim 1 wherein said polymer is a high molecular weight polyacrylamide.

13. A process as defined in claim 11 wherein said polymer is a high molecular weight acrylamide-acrylic acid copolymer.

14. A process as defined in claim 12 wherein said polymer has a molecular weight of at least five million.

15. A process as defined in claim 12 wherein said polymer has a molecular weight of at least five million.

16. A process as defined in claim 1 wherein said reaction mixture is dispersed in a liquid that is a non-solvent for both said alkyl epoxide and said polymer.

17. A process as defined in claim 16 wherein said solvent for said alkyl epoxide is selected from methanol, ethylene glycol, dimethyl sulfoxide and water, or mixtures thereof.

18. A process as defined in claim 16 wherein said alkyl epoxide is a glycidyltrialkylammonium salt.

19. A process as defined in claim 18 wherein said alkyl epoxide is a glycidyltrimethylammonium salt.

20. A process as defined in claim 19 wherein said alkyl epoxide is glycidyltrimethylammonium chloride.

21. A process as defined in claim 16 wherein said polymer is a homopolymer of acrylamide.

22. A process as defined in claim 16 wherein said polymer is a homopolymer of methacrylamide.

23. A process as defined in claim 16 wherein said polymer is an acrylamide copolymer.

24. A process as defined in claim 16 wherein said polymer is an acrylamide-acrylic acid copolymer.

25. A process as defined in claim 18 wherein said polymer is a homopolymer of acrylamide.

26. A process as defined in claim 18 wherein said polymer is an acylamide-acrylic acid copolymer.

27. A process as defined in claim 11 wherein the final reaction product is hardened by treatment with isopropanol.

28. A process as defined in claim 16 wherein the reaction product is hardened and the excess of the alkyl epoxide compound is solvent extracted for recycling from the hardened reaction product.

* * * * *

UNITED STATES PATENT AND TRADEMARK OFFICE
CERTIFICATE OF CORRECTION

PATENT NO. : 4,888,396

DATED : December 19, 1989

INVENTOR(S) : Herbert K. Reimschuessel et al

It is certified that error appears in the above-identified patent and that said Letters Patent is hereby corrected as shown below:

Data (Cover) Page, Item (75) Inventors: SECOND line, after
　　　　William G. insert --- -J. ---.

Column 1, line 11, after December delete "12" and
　　　　insert --- 21 ---.

Column 16, line 47 (being Claim 1, line 1) after preparing
　　　　delete "caationic" and insert --- cationic ---.

Column 17 line 14 (being Claim 12, line 1) after claim delete
　　　　"1" and insert --- 11 ---.

Column 17, line 21 (being Claim 15, line 1), after claim
　　　　delete "12" and insert --- 13 ---.

Signed and Sealed this

Twenty-second Day of January, 1991

*Attest:*

HARRY F. MANBECK, JR.

*Attesting Officer*　　　*Commissioner of Patents and Trademarks*